United States Patent Office 3,282,363
Patented Nov. 1, 1966

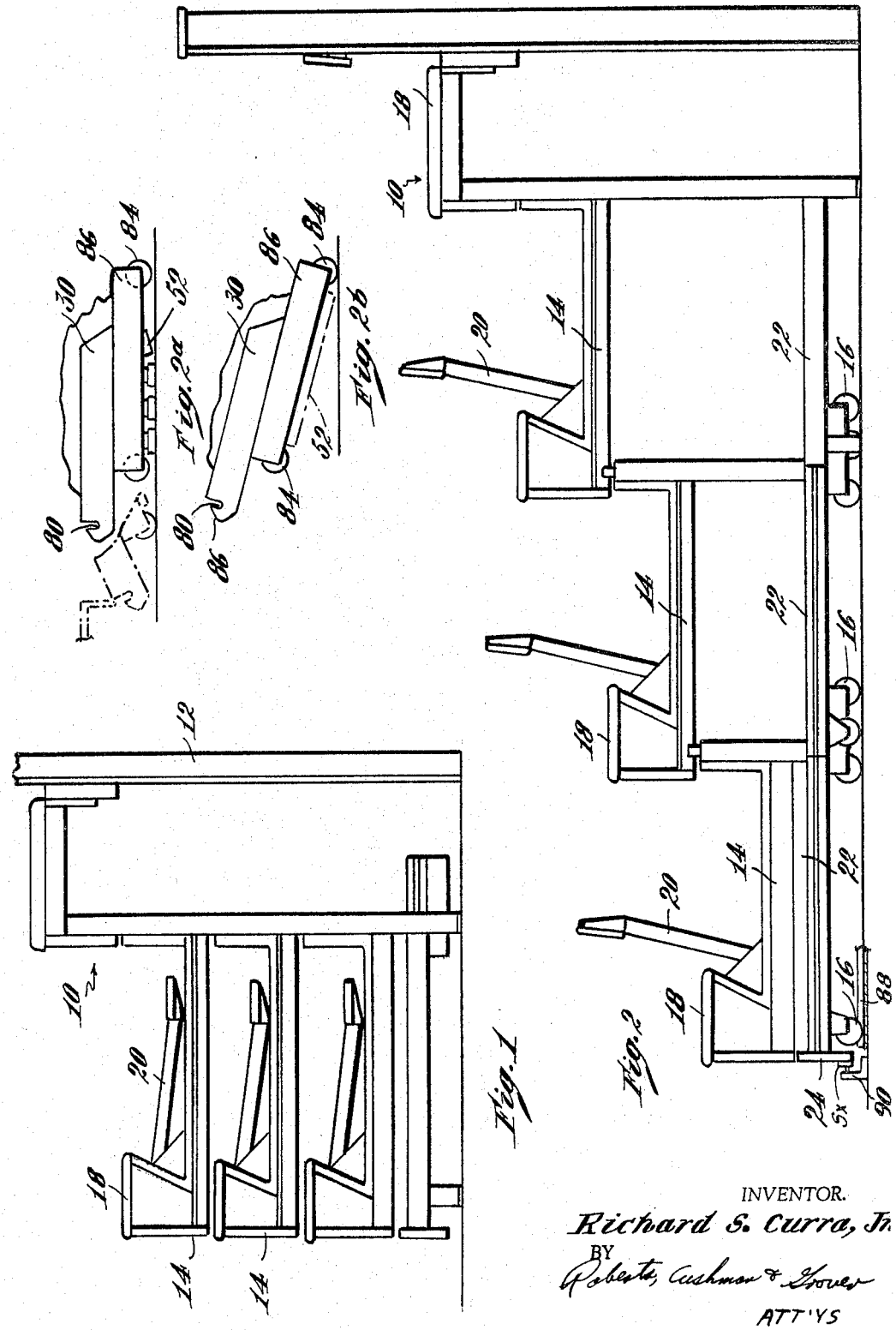

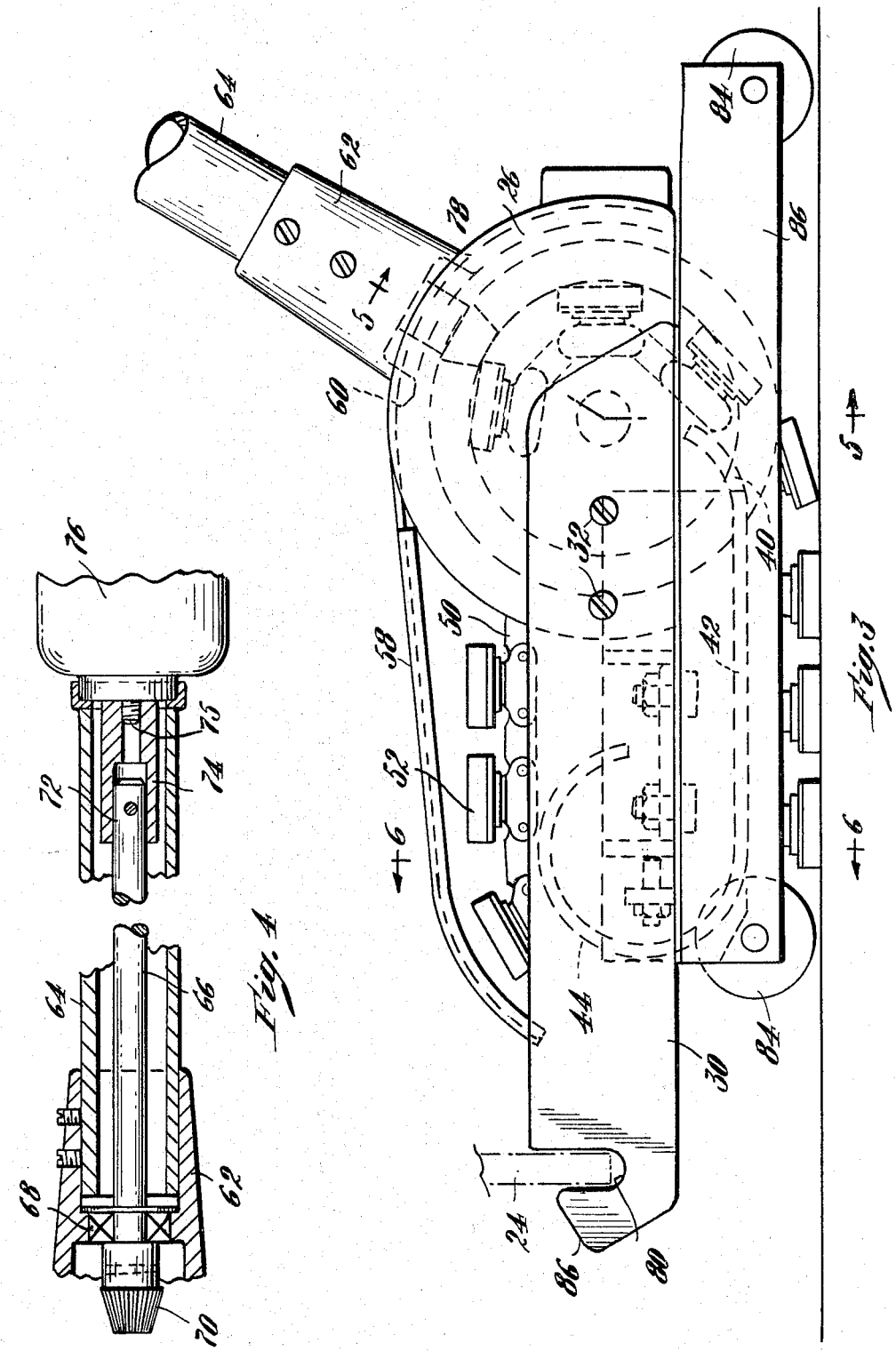

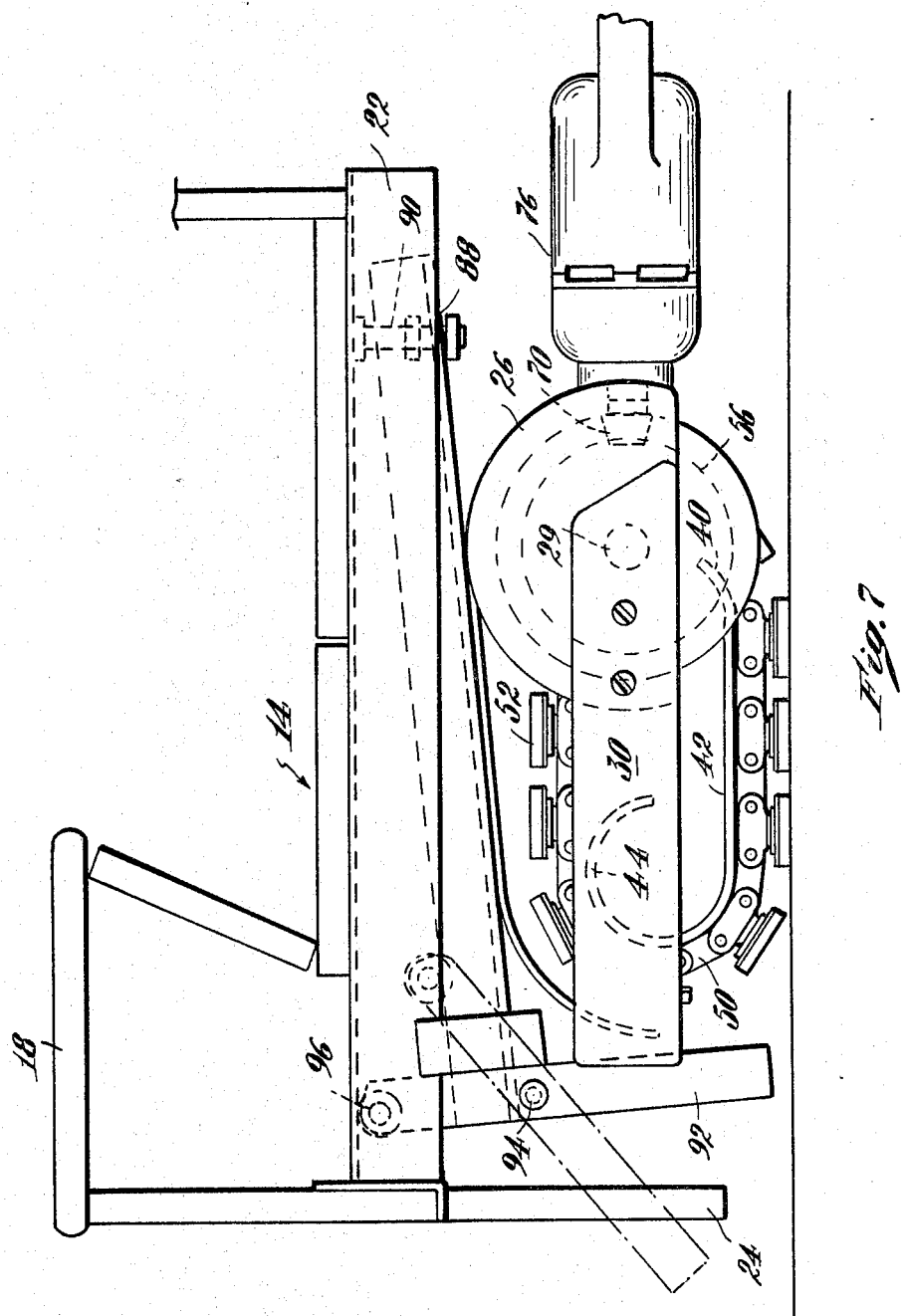

3,282,363
TRACTOR MEANS FOR EXTENDING AND RETRACTING BLEACHER STAND SECTIONS
Richard S. Curra, Jr., North Berwick, Maine, assignor to Hussey Manufacturing Company, Inc., North Berwick, Maine, a corporation of Maine
Filed Oct. 26, 1964, Ser. No. 406,498
7 Claims. (Cl. 180—9.22)

This invention relates to bleacher stands provided with telescoping sections for extension or nesting and which are used principally in gymnasiums, halls, and the like, where they are stored against the walls when not in use.

The sections of these stands are supported on wheels so that they may be rolled out from the wall for use. Nevertheless, the overall weight of the sections is such that women and girls find it difficult and sometimes impossible, without assistance, to extend the sections for use or nest them to clear the floor. The principal objects of this invention are accordingly to provide means for enabling extension or nesting of the sections without substantial physical effort; to provide means which itself consumes little power and yet is effective; to provide means which may be either connectable to the forward section of the stand to effect movement thereof or is permanently attached thereto; to provide, in the case of the connectable means, means which is easily portable for movement into operative position and for transportation from one place to another; to provide means which affords sufficient traction to enable extension or nesting of the sections on floors having hard, highly polished surfaces and even wet surfaces; to provide means which may be driven by a commercially available electric hand tool such as an electric drill, either cooperable therewith when needed, or permanently attached thereto; to provide a coupling for detachably connecting the tool when it is not permanently installed; and to provide means which is comparatively small in size, simple in construction and durable.

As herein illustrated, the aforesaid means is a relatively small compact tractor. The tractor comprises a chassis and a tractor tread mounted thereon. The chassis is adapted to raise the foremost section of the bleacher from the floor so that it rests on and is supported by the portion of the tractor tread having engagement with the floor, and there is a drive gear for effecting rotation of the tractor tread. The chassis in one form has forwardly projecting notched bars engageable with the bleacher section, pivots forwardly of the tread about which the tractor is tiltable to engage the notched bars beneath the bleacher section and raise it onto the tractor tread, and wheels at its rear end about which the tractor may be tilted to raise the tractor tread from the floor to enable trundling the tractor about. An electric hand tool, such as an electric drill, is provided to supply the power necessary to rotate the tractor tread and a coupling element is provided having at one end connecting it to the drive gear and means at the other end adapted to be clamped in the drill chuck. Alternatively, the tractor chassis may be pivotally secured to the underside of the foremost section, in which case there is means in the form of a pivoted arm operable to effect relative movement between the chassis and the section either to place the tractor tread in driving contact with the floor or to place the footing of the section in contact with the floor. In this form of the invention, an electric hand drill, or its equivalent, is also used to provide power for driving the tractor tread and differs only in that it is permanently installed.

The electric power necessary to drive the motor of the drill may be supplied by a flexible cord adapted to be plugged into a wall outlet or, if desired, a storage battery may be mounted on the chassis for supplying the electric power.

The invention will now be described in greater detail with reference to the accompanying drawings wherein:

FIG. 1 is an end elevation of a bleacher stand stored against the wall with the sections nested in vertically subjacent position relative to each other;

FIG. 2 is an end elevation of the stand with the sections extended for use;

FIG. 2a is an elevation of a tractor by means of which the sections of a bleacher stand may be extended or retracted, shown in a horizontal position resting on its tread and tilted upwardly about the wheels at its forward end to engage it with the stand;

FIG. 2b is an elevation corresponding to FIG. 2a, showing the tractor tilted upwardly about the wheels at its rear end to enable trundling it about;

FIG. 3 is a side elevation of the tractor, to much larger scale;

FIG. 4 is an enlarged section of a coupling for connecting an electric hand tool to the tractor by means of which the tractor is driven;

FIG. 7 is an elevation of an alternative arrangement in which the tractor is permanently connected to the underside of the forward section of the stand;

Figure 6:
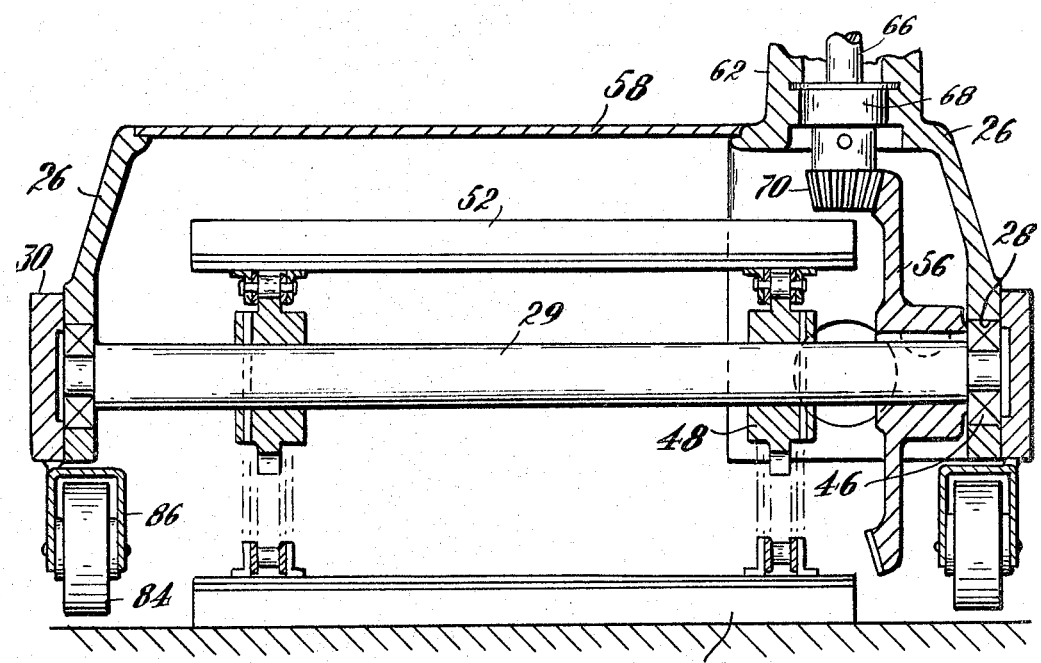
FIG. 6 is a section taken on the ilne 6—6 of FIG. 3.

Referring to the drawings, FIGS. 1 and 2 show in elevation a bleacher-type stand for indoor use comprising a section 10 which is fixed to the wall 12 and sections 14 extendable from vertically subjacent nested positions, as shown in FIG. 1, to extended stepped positions, as shown in FIG. 2. Each of the sections has a seat 18 and the movable sections have backs 20 which may be rotated rearwardly to enable nesting the sections.

The movable sections 14 are supported on the floor by wheels 16 mounted on supporting frames 22 for the respective sections. The foremost one of the frames 22 has fixed to its forward edge a vertically disposed, transversely extending plate 24, the lower edge of which is parallel to the floor and provides means, as will appear hereinafter, for rolling the sections outwardly or forcing them back against the wall. A tractor is provided for effecting movement of the sections 14 and in one form, as illustrated in FIGS. 3 and 6, has a chassis comprised of transversely spaced parts 26 containing aligned openings 28 for receiving the opposite ends of a drive shaft 29, horizontally disposed, spaced parallel bars 30 secured to the outer sides of the parts 26 by bolts 32 with their rear ends covering the openings 28 and their forward ends extending forwardly of the shaft 29, and pairs of tractor tread guides 34 (FIG. 5) mounted between the bars 30 forwardly of the shaft 29. The guides 34 are secured by bracket members 36 and 38 fastened, respectively, to the guides and to the bars 30 and have at their rear ends curved portions 40, forwardly thereof straight portions 42, and at their forward ends curved portions 44.

The shaft 29 is rotatably supported at its ends by roller bearings 46 disposed in the openings 28 and has fixed to it transversely spaced sprockets 48. A tractor tread comprised of link chains 50 and transversely disposed tread members 52 secured to alternate links is entrained about the sprockets 48 and the guides 34. The sprocket chains include roller bearings for contact with the guides 34 so as to enable the chains to roll freely over the surfaces thereof.

A large gear 56 is keyed to the shaft 29 for effecting rotation thereof and of the tractor tread and the upper side of the chassis and the upper run of the tractor tread is enclosed by a cover 58.

In this form of the invention, the tractor is preferably driven by a hand tool, such as an electric drill, which may be purchased at a relatively low cost or may be borrowed for this purpose from the maintenance department of the school or auditorium. For this purpose the part 26 adjacent the drive gear 56 has an integral hollow socket 62 in communication with the interior of the chassis adjacent the drive gear 56. One end of a shaft 66 is journaled in the socket in a bearing 68 and has fixed to its inner end a pinion 70 which meshes with the drive gear. The other end of the shaft 66 is pinned to an adapter 74 for detachably connecting the shaft to an electric drill 76. This is accomplished by removing the chuck and screwing the adapter 74 onto the screw 75 from which the chuck was removed. A rigid hollow sleeve 64 is mounted over the shaft with one end fixed in the socket and its other end engaged with the drill housing. The sleeve encloses the shaft 66 and provides, in conjunction with the drill at its distal end, a rigid handle by means of which the tractor may be trundled about and moved into and out of operative position. The ratio of the pinion 70 to the gear 56 is such that the relatively low power of the electric drill is sufficient to rotate the tractor tread. The drill may be removed for other use at any time that it is not in actual use for extending or retracting the sections of the stand.

Figure 5:
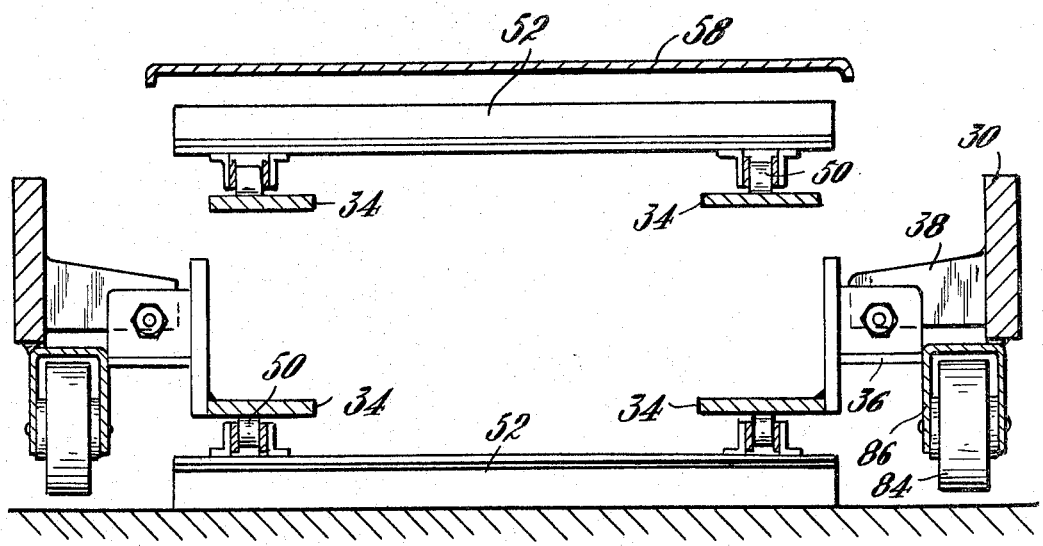
FIG. 5 is a section taken on the line 5—5 of FIG. 3.

Pairs of wheels 84 are provided forwardly and rearwardly of the tread to enable moving the tractor into position and trundling it about from one place to another. The wheels 84 are rotatably mounted at the opposite ends of two channel members 86 secured, respectively, to the undersides of the bars 30, for example by welding, as shown in FIGS. 5 and 6. The wheels normally are spaced from the floor when the tractor rests horizontally on the lower run of the tread.

In order to engage the tractor with the forward section of the bleacher, the forward ends of the bars 30 are provided with notches 80 (FIGS. 2a and 3) adapted to receive the lower edge of the plate 24. To effect such interengagement the tractor is tipped upwardly about the axis of the front wheels 84 so as to lower the forward ends of the bars as shown in FIG. 2a, then rolled under the lower edge of the plate 24, and finally is tilted downwardly about the axis of the wheels which now become fulcrums, providing leverage by means of which the forward section can be raised from the floor sufficiently to place its entire weight on the lower run of the tractor tread 52. The handle referred to above provides means for tilting the tractor. Actuation of the tractor tread to effect movement will now provide for movement of the section forwardly or rearwardly as the case may be. To assist in thrusting the forward ends of the bars 30 beneath the lower edge of the plate 24, the forward ends of the bars are provided with inclined cam surfaces 86.

The tractor tread with its multiple ground-engaging tread surfaces afford sufficient frictional contact with the floor even though the latter has a hard, high polished finish or is wet, to enable easily rolling the sections out to extend the sections or rolling them back to nest the sections.

The large gear-reduction ratio between the pinion and the drive gear 56 results in a rather slow movement of the tractor which, of course, is perfectly satisfactory for moving the bleacher sections in or out. The rear wheels 84 enable trundling the tractor about from one part of the building to another by tilting it upwardly about the rear wheels as a center as shown in FIG. 2b, to lift the tread from the floor.

The tractor described above is particularly advantageous in that it is completely mobile and may be moved about from one bleacher stand to another so that one unit is all that is required for a number of bleacher stands as, for example, for a single installation of stands in a hall or gymnasium. Where cost is not as important a factor a tractor unit may be secured permanently to the underside of the forward sections of each bleacher stand in the hall.

These tractor units correspond substantially in structure to that shown in FIGS. 3, 4 and 5, except that, as shown in FIG. 7, the electric drill 76 is permanently mounted to the part 26 of the chassis with no intervening coupling. The chassis is pivotally fastened to the underside of the section 14 by a beam 88. The beam is secured to the top of the chassis and has portions extending forwardly and rearwardly thereof. The rearwardly extending portion is connected to the frame 22 by bolts 90 so that it is free to tilt upwardly and downwardly. A leg 92 is pivotally connected at 94 to the forward end of the beam and has at its upper end a roller 96. By rocking the leg 92 from the dotted line position to the solid line position, the frame 22 is raised relative to the chassis of the tractor thereby lifting the wheels 16 from the floor so that the entire section rests on the tractor. By pulling the leg 92 forwardly from the solid line position to the dotted line position, the frame 22 is depressed to bring the wheels 16 into engagement with the floor so as to take the weight off of the tractor tread. When the section has been raised from the floor, power supplied to the tractor will effect movement thereof so as to extend or retract the sections.

In this form of the invention, the wheels 84 and supports 86 therefor are omitted and the drill 76 repositioned to enter the chassis through an opening located on a substantially horizontal axis as shown in FIG. 7. The handle employed in the mobile form is not required.

Conventional electric drills such as a Black & Decker drill may be used for the purpose of supplying the power for motivating the tractor shown herein whether of the mobile type or the permanently installed type and usually these are provided with flexible cords which may be plugged into wall outlets. If such wall outlets are not available or not convenient, it is possible and it is contemplated as part of this invention to mount a storage battery on the tractor chassis for supplying power to the drill motor.

If desired, tracks 88 (FIG. 2) may be provided on the floor for guiding the wheels 16 and usually a barrier 90 is provided at the forward end of the tracks to limit the outward extension of the sections. When such structure is used, a proximity switch Sx is mounted on the forward section of the bleacher which is operable automatically to disable the drill motor by cutting off the current thereto when the section reaches the barrier. This prevents damage to the stand or to the tractor by neglect to shut off the motor at the proper time.

It should be understood that the present disclosure is for the purpose of illustration only and that this invention includes all modifications and equivalents which fall within the scope of the appended claims.

I claim:

1. A tractor for use in extending and nesting the sections of a bleacher provided with telescoping sections, comprising a chassis, a shaft on the chassis, a pair of sprockets on the shaft, curved guides on the chassis spaced from the shaft, a tractor tread entrained about the sprockets and the guides, a drive gear fixed to the shaft, a pinion meshing with the drive gear, a drive shaft to which the pinion is fixed, an electric motor-driven hand tool having a motor shaft provided with a threaded portion and an adapter connected to the drive shaft, said adapter having a portion threaded onto the motor shaft.

2. A tractor for use in extending and nesting the sections of a bleacher provided with telescoping sections, comprising a chassis, a pair of notched bars extending forwardly from the chassis, an endless tractor tread, means on the chassis supporting the tractor tread for movement about spaced parallel axes, said means including a drive shaft, a drive gear fixed to the drive shaft, a handle rigidly connected to the chassis, said handle extending upwardly and rearwardly therefrom and being hollow, a shaft journaled in the handle with one end entering the chassis, a pinion fixed to the end of the shaft in mesh with the drive gear, and an adapter at the upper end of the shaft adapted to be secured to the shaft of an electric motor.

3. A tractor for moving telescoping sections of a bleacher stand relative to each other to extend or nest the sections, comprising a chassis, a pair of notched bars extending forwardly from the chassis, said notched bars being adapted to be engaged with the foremost section of the bleacher, an endless traction member mounted on the chassis, said traction member having upper and lower runs, the lower one of which supports the chassis from the floor at a height such that the notched bars are adapted to support the bleacher off the floor, said tractor member comprising transversely disposed, spaced parallel rectangular pads having transversely continuous flat surfaces for contact with the floor, means for effecting movement of the tractor member, and electrically driven means operably associatable with said last-named means to effect operation thereof.

4. A tractor according to claim 3, wherein the tractor member comprises a pair of link chains, a pair of sprockets on the chassis supporting the chains at one end, a pair of guides on the chassis supporting the chains at their other ends, a pad connected to every other pair of links, and roller bearings on said chain links for contact with the guides, said means for effecting movement of the tractor member comprising a shaft to which the sprockets are fixed.

5. A tractor according to claim 3, wherein the tractor member comprises a pair of link chains entrained at their opposite ends, respectively, on a pair of sprockets fixed to a drive shaft, and a pair of guides, said guides having arcuate portions at their forward ends spaced forwardly of the drive shaft, straight portions extending from the forward ends rearwardly and parallel to the chassis for supporting the lower runs of the link chains while the pads have contact with the floor, and arcuate rear ends terminating adjacent the drive shaft for guiding the chains onto the sprockets.

6. A tractor according to claim 3, comprising a first pair of transversely spaced parts containing aligned bearing openings, bearings situated in said openings, and a shaft mounted in the bearings, a pair of elongate beams secured in transversely spaced parallel relation to the outer sides of the first pair of parts with their rear ends covering the bearing openings, a pair of bracket members secured to the confronting faces of the beams extending inwardly toward each other, a pair of tracks secured to the brackets, said tracks embodying arcuate portions aligned with the sprockets which provide collectively with the sprockets support for a pair of link chains, and straight portions extending rearwardly from the arcuate portions substantially to the lines of tangency of the lower runs of the chains with the sprockets, said straight portions supporting the lower runs of the chain while the pads thereon have contact with the floor.

7. A tractor according to claim 6, comprising a pair of channel members mounted at the lower sides of the beams with their open sides down, said channel members extending forwardly and rearwardly of the tractor member, and wheels mounted at the opposite ends of the channel members with their peripheral surfaces elevated from the plane of the pads which have contact with the floor.

References Cited by the Examiner

UNITED STATES PATENTS

| | | | |
|---|---|---|---|
| 2,828,826 | 4/1958 | Riemenschneider | 180—1 |
| 2,851,179 | 9/1958 | Vance | 180—19 X |
| 2,856,015 | 10/1958 | Stefan | 180—9.22 |
| 2,968,842 | 1/1961 | Murphy | 52—10 |
| 3,052,929 | 9/1962 | Busse | 52—10 |
| 3,092,200 | 6/1963 | Chambers | 180—9.22 |
| 3,094,186 | 6/1963 | Lappin | 180—19 |
| 3,156,315 | 11/1964 | Hawgood | 180—19 X |

BENJAMIN HERSH, *Primary Examiner.*

R. J. JOHNSON, *Assistant Examiner.*